Figure 6:
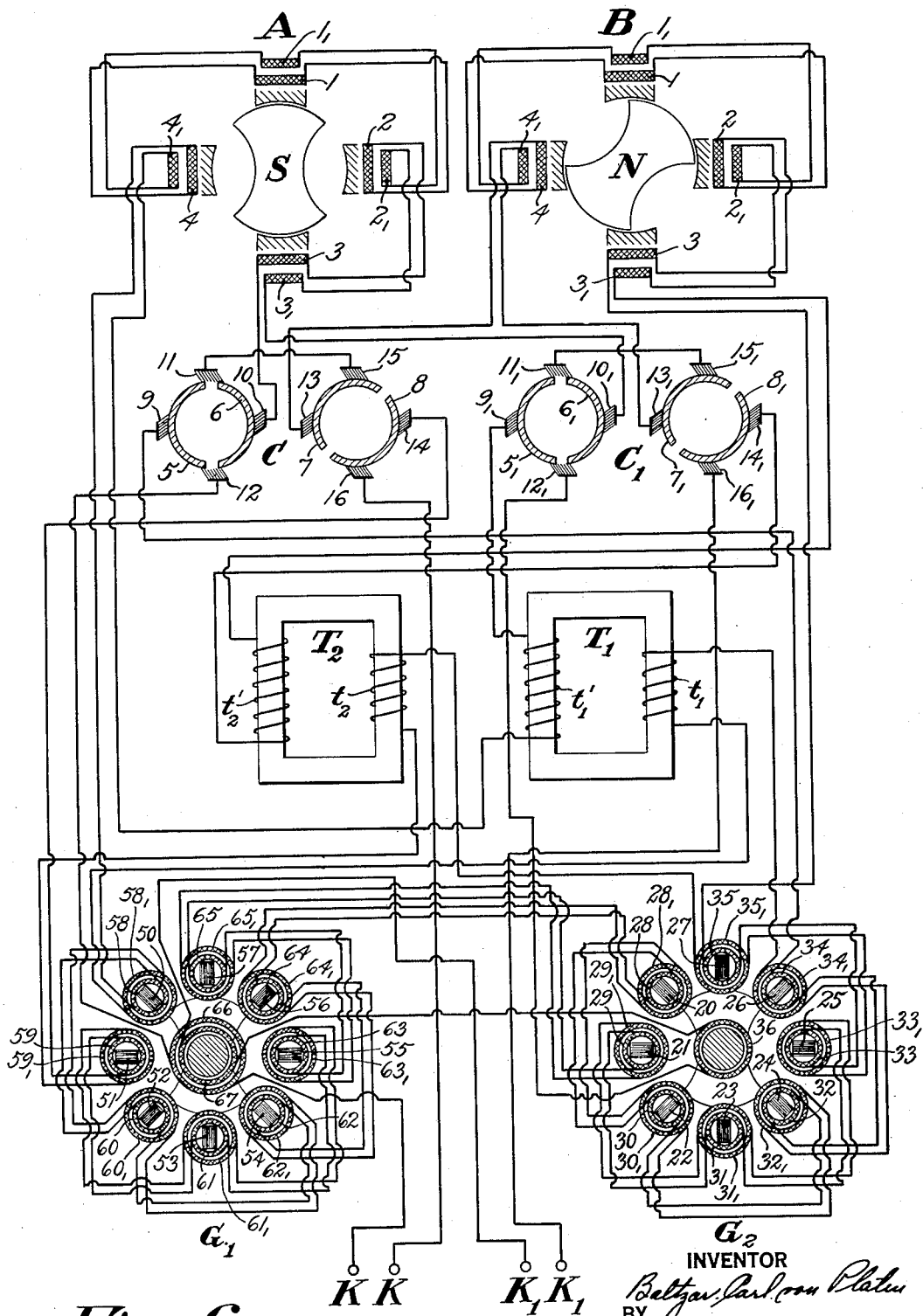

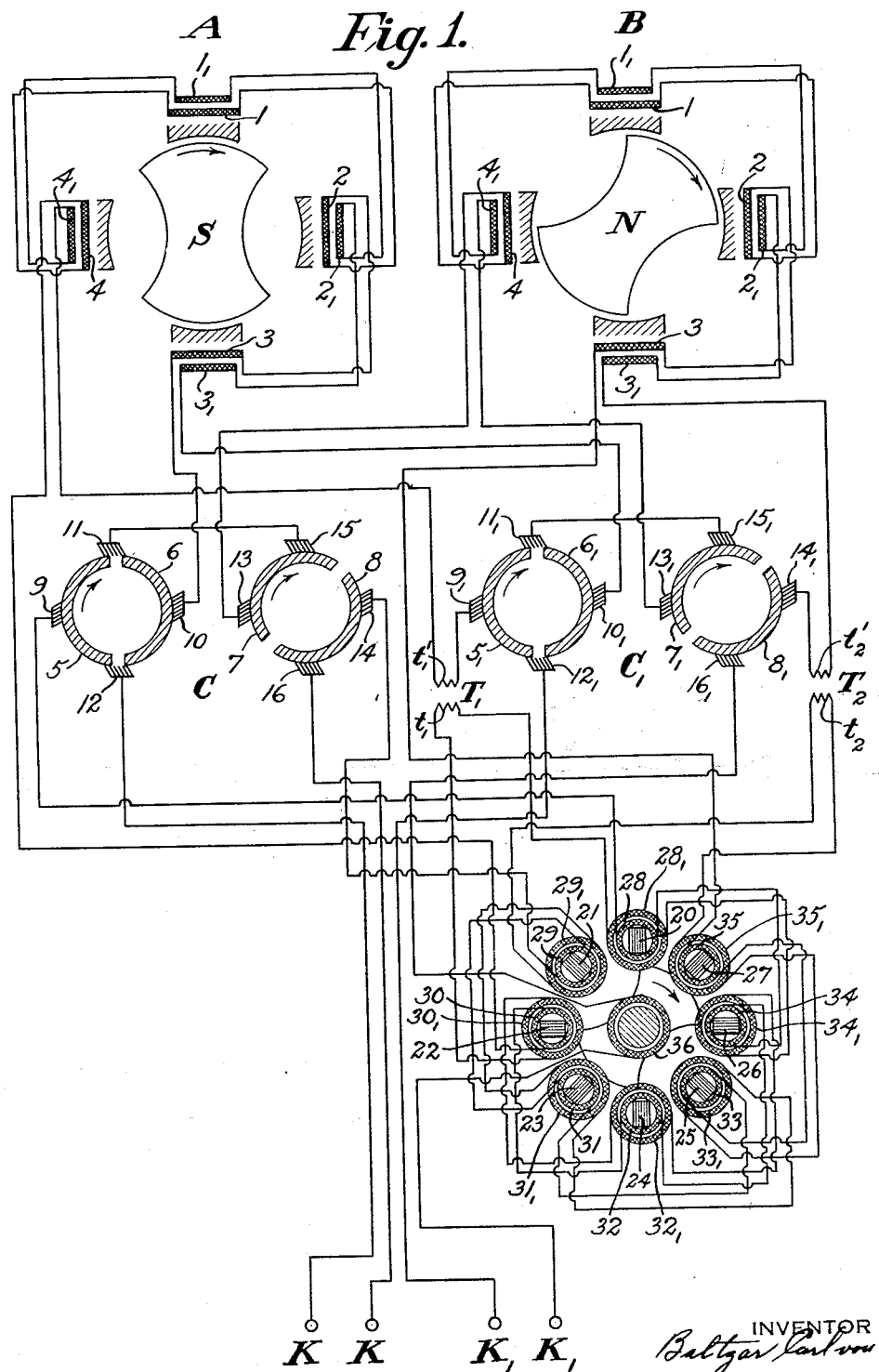

July 4, 1933. B. C. VON PLATEN 1,916,241
ELECTRIC MACHINE
Filed Dec. 20, 1930 6 Sheets-Sheet 2
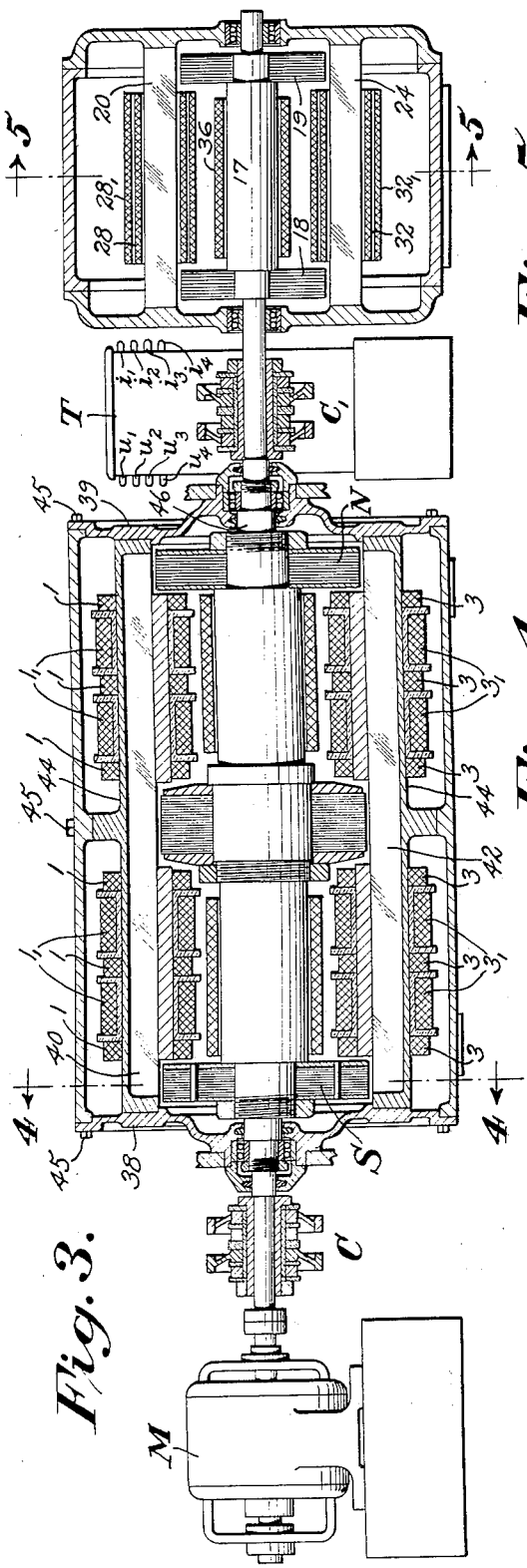
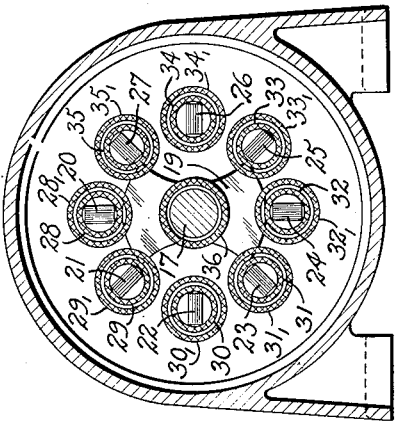
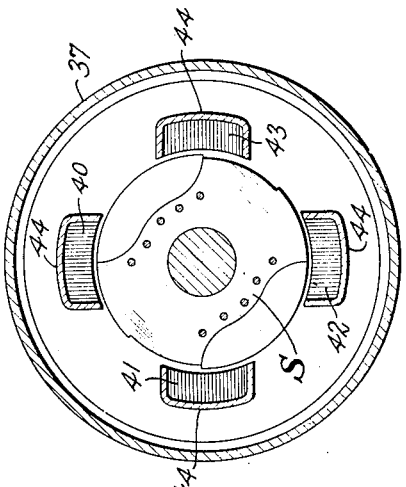
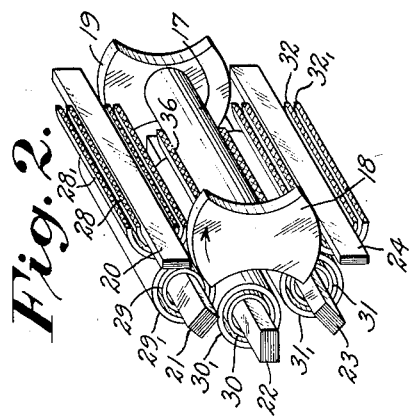
INVENTOR
Baltzar Carl von Platen
BY
his Wm T Hedlund
ATTORNEY July 4, 1933.                B. C. VON PLATEN                1,916,241
                              ELECTRIC MACHINE
                           Filed Dec. 20, 1930           6 Sheets-Sheet 4
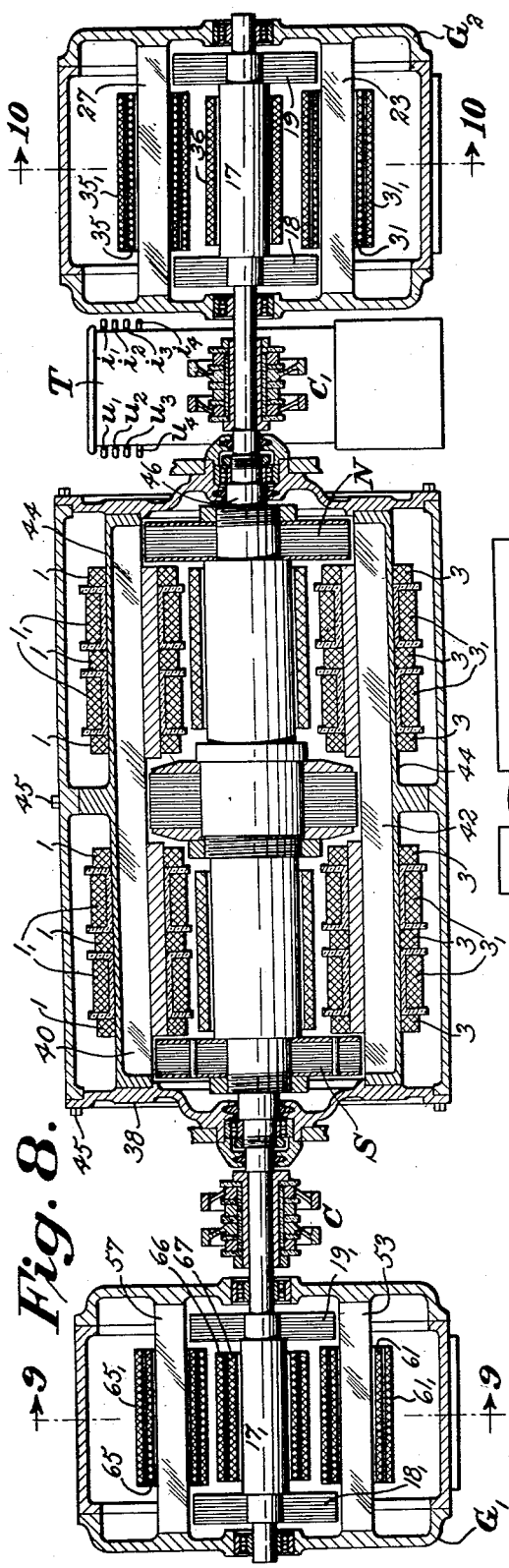
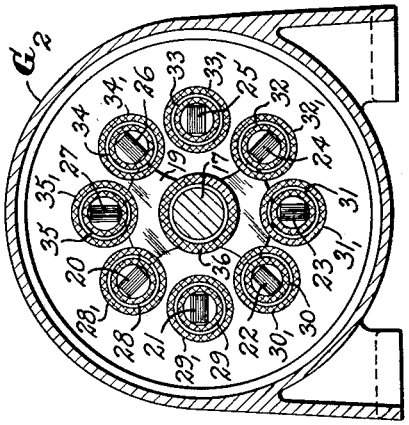
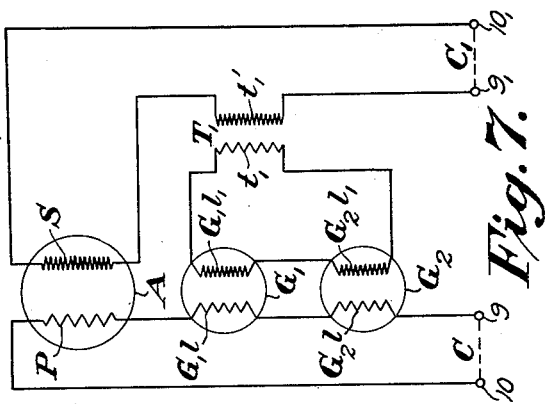
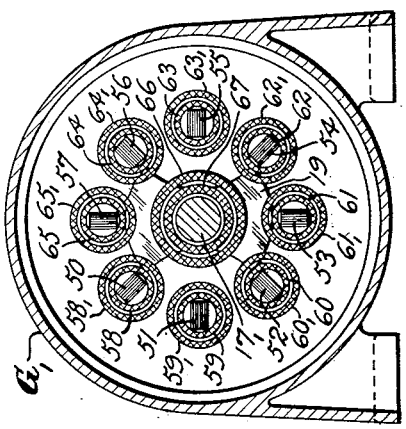
INVENTOR
Baltzar Carl von Platen
BY
his ATTORNEY Patented July 4, 1933

1,916,241

UNITED STATES PATENT OFFICE

BALTZAR CARL von PLATEN, OF STOCKHOLM, SWEDEN

ELECTRIC MACHINE

Application filed December 20, 1930, Serial No. 503,711, and in Sweden December 23, 1929.

My invention relates to the type of direct current transformers which are provided with at least two axially displaced systems of primary and secondary armature windings conducting alternating currents, said windings being connected with commutators by means of which the alternating voltages of the armature windings are rectified and added. The invention has for its object to provide means for regulating the commutation voltage in such machines.

In direct current transformers of this type it is possible to operate with very high voltages, for instance of the order of 100,000 volts, without the difficulties with respect to insulation which, in other types of machines, increased rapidly with an increase in voltage. It has, however, been found that at these high voltages the difficulties in commutation have prevented the practical use of the machine.

These difficulties in commutation are overcome by an arrangement according to the present invention which is chiefly characterized by the provision of one or more commutating generators provided with separated "primary" and "secondary" generating windings connected to the armature windings, if necessary by transformers, and with one or more exciting windings which preferably are connected in the main direct current circuits of the machine and create a rotating field within the commutating generator or generators. By providing the commutating generator with separated "primary" and "secondary" generating windings which are connected to the primary and secondary windings of the transformer, voltages can be created in the commutating generator which compensate for the commutation voltages of the transformer.

When the no-load losses of the transformer are compensated for by other means, for instance by a separate driving motor, it is only necessary that the excitation of the commutating generator be proportional to the secondary current of the transformer, this being obtained by connecting the exciting winding of the commutating generator in series with the secondary circuit of the transformer. By this means the commutating generator is able to reduce or fully compensate for the voltages occurring during commutation of the transformer windings due to unavoidable leakage flux thereby causing the sparking to be reduced or neutralized.

If on the other hand the no-load losses of the transformer are also to be compensated for by the commutating generator, the excitation of the commutating generator must be proportional to the no-load component of the primary current, that is, to the current which on the primary side of the transformer is needed for covering said no-load losses. This may be effected by providing the commutating generator with two exciting windings counteracting each other, the one of said windings being connected in series with the primary circuit of the transformer and the other with the secondary circuit of the same.

If the direct current transformer is provided with two commutating generators adapted to compensate for the no-load losses and the leakage losses of the transformer, i. e. when the transformer is driven entirely electrically without any separate driving motor, the generating windings of the two commutating generators should preferably be connected in series to each other in order to avoid reaction on the secondary side of the transformer due to the changes in voltage occurring on the primary side and vice versa. During the periods of commutation the one commutating generator may thereby reduce the primary current of the transformer by twice the magnitude of the no-load component of said current without reacting on the secondary current, and then the second commutating generator may compensate for the primary current thus reduced and for the secondary current simultaneously while neutralizing the leakage voltage. If, however, the primary or secondary voltage of the transformer is essentially higher than the other, the arrangement may preferably be such that the exciting winding of the one commutating generator is connected only to that one of the primary and secondary circuits of the transformer which has the lower voltage, whereas the exciting windings of the second commutating generator are connected to both circuits of the transformer or to that one of the same which has the higher voltage.

The invention will be more fully described with reference to the embodiments shown by way of example in Figs. 1-12 of the accompanying drawings in which connection also further characteristic features of the invention will be set forth.

Figure 11:
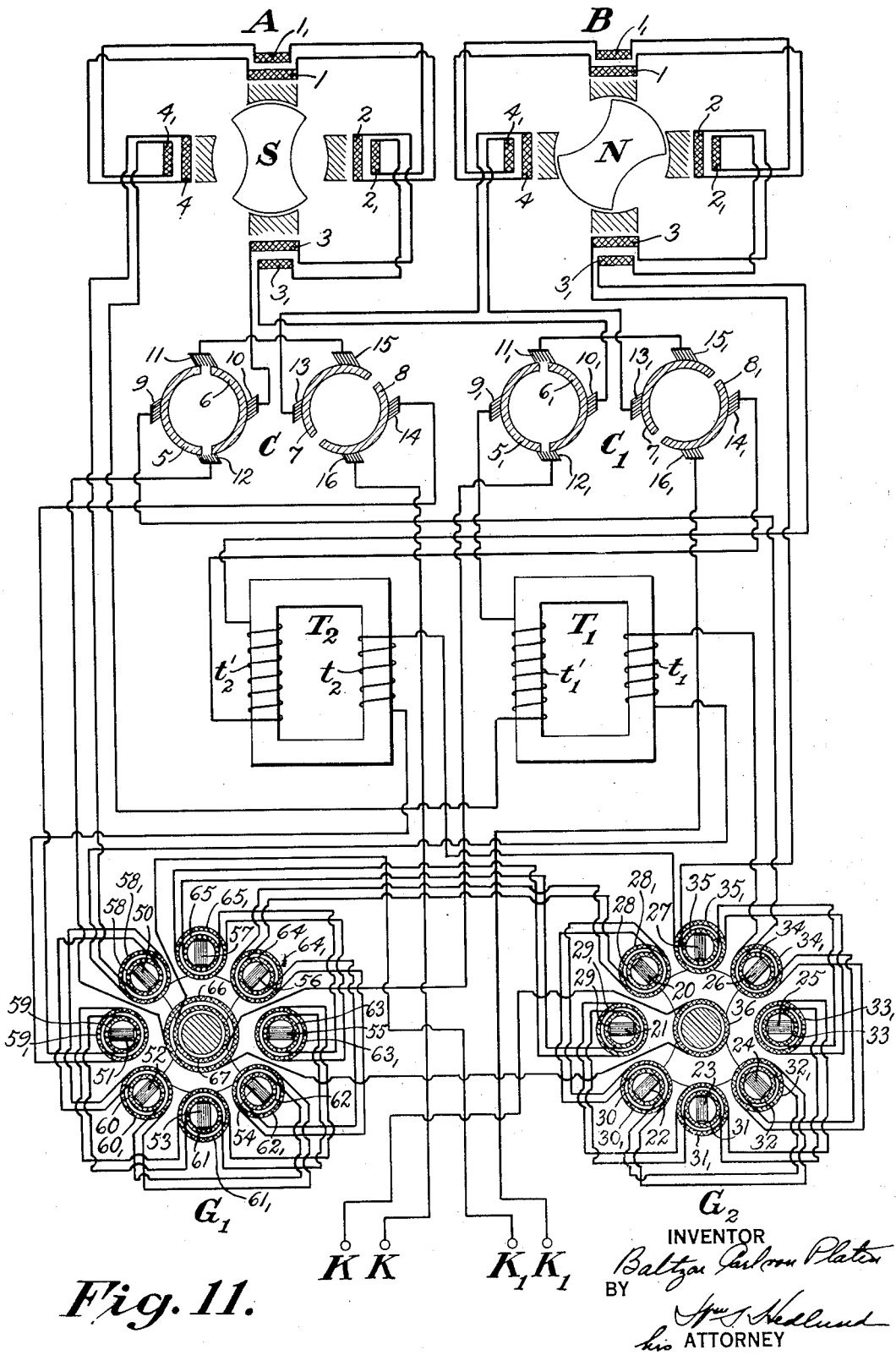
Figure 12:
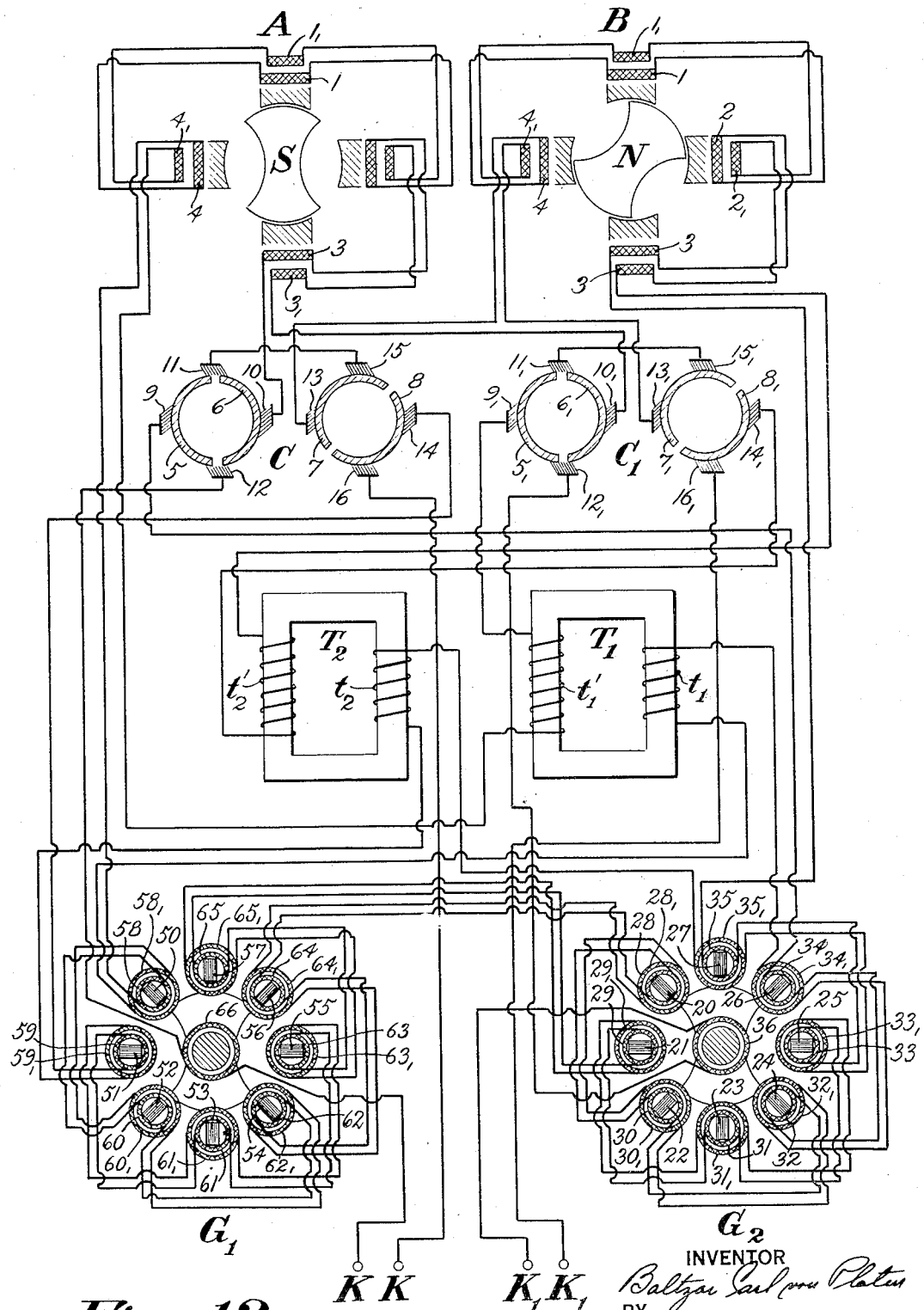

In the drawings forming a part of the present application, Fig. 1 shows a schematic diagram of a direct current transformer constructed in accordance with one form of the present invention. Fig. 2 is a perspective view partly broken away of the commutating generator. Fig. 3 is a longitudinal section through the machine reached in Fig. 1. Fig. 4 is a section taken on the line 4—4 of Fig. 3. Fig. 5 is a section taken on the line 5—5 of Fig. 3. Fig. 6 is a schematic diagram of a machine constructed in accordance with a modified form of the invention. Fig. 7 is a wiring diagram illustrating the connections of the said machine. Fig. 8 is a longitudinal section of the machine reached in Fig. 7. Fig. 9 is a section taken on the line 9—9 of Fig. 8. Fig. 10 is a section taken on the line 10—10 of Fig. 8, and Figs. 11 and 12 are schematic diagrams of further modified forms of the invention.

In order to secure perspicuity, the direct current transformer has throughout the specification been assumed to be of the rotating homopolar type, this being also the case with regard to the commutating generator or generators and the only essential differences in the various embodiments consist in the number of winding systems used and in their mutual connections. It is, however, to be noted that the invention is in no way restricted to the embodiments thus given by way of example, as many modifications of the same may be made without going beyond the scope of the invention.

The direct current transformer shown in Fig. 1, the no-load losses of which are compensated by mechanical energy supplied by a separate driving motor M see Fig. 3, consists of the parts A, B, C and $C_1$, A and B designating each of the stator and rotor halves and C and $C_1$ commutator devices for the primary and secondary armature windings respectively of the parts A and B. Reference character N designates a rotating north pole and S a south pole angularly displaced in relation to said north pole by 45°. Magnetic lines of force emanate from and enter said poles respectively which rotate synchronously in relation to each other, for instance are mechanically connected to each other. This magnetic flux may be effected by an exciting winding surrounding the rotor core, said winding being stationary or rotatable with the poles, or said poles may belong to a permanent magnet. The stator consists of two similar halves A and B axially displaced from each other. Arranged on the iron cores of said stator halves are two separated primary armature winding systems, each consisting of four coils, 1, 2, 3 and 4 interconnected in series and surrounding the four iron cores of the stator halves which co-operate with the rotor poles. The primary armature windings are connected with a commutator device C consisting of two sections each divided into two equal segments 5, 6 and 7, 8 respectively. Four contact brushes 9, 10, 11, 12 and 13, 14, 15, 16 respectively co-operate with each section. The openings between the segments of the different sections are angularly displaced relatively to each other due to the phase displacement between the voltages created in the corresponding armature windings, in the present case by 45°.

The commutator brushes are stationary whereas the commutators are arranged on the machine shaft and rotate with the same in the direction shown by the arrows in Figure 1, the positions of the segments being such that the alternating voltage in each armature winding passes its zero value while the corresponding brushes pass the gaps between the commutator segments.

Brushes 11 and 15 are connected with each other whereas brushes 9 and 10 are connected with the poles of the primary armature windings of the stator half A and brushes 13 and 14 with the poles of the primary armature windings of the stator half B.

The parts above described form the primary side of the direct current transformer and the primary direct current is supplied to the transformer by brushes 12 and 16 connected to terminals K, K.

The secondary armature windings of the transformer which in Figure 1 are designated by indexed reference characters corresponding to those of the primary windings are provided on the same iron cores as said primary windings and are arranged around or beside the same. The secondary armature windings are connected with a commutator device $C_1$ of the same construction as the commutator C and from which the secondary direct current is supplied to the terminals $K_1$, $K_1$ by brushes $12_1$ and $16^1$.

These parts form the secondary side of the direct current transformer.

In order to obtain a substantially sparkless reversal of current during the process of commutation, a commutating generator is connected with the two circuits of the primary side and of the secondary side of the transformer. The rotor of said commutating generator which is of the homopolar type is designated by 17, 18, 19 (Fig. 3) and rotates synchronously with the main machine being, for instance, directly connected to the shaft of the same. Around said rotor are eight iron cores 20—27 of laminated iron arranged at equal distance from each other. These stationary cores are provided with winding coils 28—35 respectively of which the coils 28, 30, 32 and 34 are connected in series and form a generating winding connected to the primary armature winding of the half A of the machine. The remaining coils 29, 31, 33 and 35 are also interconnected in series and form a generating winding connected to the primary armature winding of the half B. Similar to the main machine, there are arranged on the commutating generator around its "primary" generating windings corresponding "secondary" generating windings which in the manner above described are connected to the secondary armature windings of the main machine suitably by auxiliary transformers $T_1$ and $T_2$ if the secondary tension of the direct current transformer is of high voltage. The exciting winding 36 of the commutating generator is connected in series with the secondary main circuit, i. e. interconnected between the terminals $K_1$, $K_1$ and the brushes $12_1$, $16_1$, whereby the excitation always becomes proportional to the magnitude of the secondary current and thus also to the primary current due to the fact that the ampere turns of said currents are assumed to be equal.

In the position shown in Fig. 1 commutation of the primary current takes place in the machine half A at the segments 5, 6 and simultaneously of the secondary current in the same machine half at the segments $5_1$, $6_1$. As will be clear from the figures, the magnetic fluxes through the cores 20 and 24 of the commutating generator are at the same time reduced whereas the fluxes through the cores 22 and 26 are increased causing voltages to be induced in the corresponding coils 28, 32 and 30, 34 of the primary winding and $28_1$, $32_1$ and $30_1$, $34_1$ of the secondary winding of the commutating generator, said voltages reversing the primary and the secondary currents respectively in said half of the main machine. In a similar manner commutation will then take place in the machine half B at the segments 7, 8 and $7_1$, $8_1$ causing voltages to be induced in the second winding system 29, 31, 33 and 35, and $29_1$, $31_1$, $33_1$ and $35_1$ respectively. Hereby an exact reversal will be effected on account of the voltages induced in the commutating generator being proportional to its rotor-pole strength which in turn is dependent on the ampere turns of the exciting winding 36 which is proportional to the secondary current and consequently also, according to the assumption, to the primary current.

The length of the interval of commutation is dependent on the width of the iron cores 20—27 of the commutating generator. By connecting both its secondary winding systems to the corresponding armature windings by auxiliary transformers $T_1$ and $T_2$ the commutating generator may be constructed for a considerably lower voltage than the main machine. Thereby the construction of the commutating generator can be simplified and the dimensions of the same may be made considerably smaller than when the generator is connected directly to the high-tension winding systems of the main machine in which case considerable difficulties would arise with regard to insulation.

Obviously the commutating generator may be excited separately and the excitation may be regulated by means of relays or the like so that the correct value thereof always is secured.

The commutating generator may also be adapted to operate only during part of the time of commutation, for instance by suitable selection of the width of its stator cores, whereby it will be possible for the commutator brushes which, for instance, may be divided into two or more parts with condensers interconnected therebetween, to operate without disturbance during the rest of the time of commutation thereby equalizing small irregularities in the voltage created by the commutating generator. In this manner the current is reversed by the commutating generator and has obtained a value nearly corresponding to that of the primary current supplied, or created respectively, before a brush part leaves the segment, i. e. before a condenser is connected to the circuit. Hence the condensers may be relatively small, as it is only necessary to dimension the same for equalization of said difference in voltage. This combination of a commutating generator with divided commutator brushes provided with condensers is of great importance in direct current transformers operating at high voltages or high currents, in which case difficulty may be experienced in obtaining an exact reversal due to the small irregularities of the commutating generator above mentioned.

As will be seen from Fig. 3, the commutating generator is connected directly to the shaft of the main machine outside the commutator device $C_1$. The receptacle T surrounds the auxiliary transformers $T_1$, $T_2$ shown in Fig. 1 and is provided with terminals $i_1$—$i_4$ for the low-tension windings $t_1$ and $t_2$ and with terminals $u_1$—$u_4$ for the high-tension windings $t_1'$ and $t_2'$ adapted to be connected with the secondary generating windings $28_1$, $30_1$, $32_1$, $34_1$ and $29_1$, $31_1$, $33_1$, $35_1$ and to the secondary winding systems 1—4 of the main machine respectively in the manner shown in Fig. 1. To the opposite end of the machine shaft an electric motor M is connected outside the commutator device C, said motor being provided for compensating the no-load losses of the direct current transformer.

The commutating generator may, of course, be constructed in a similar manner as the main machine; i. e. be provided with axially displaced systems of generating windings. As in the main machine, the rotor poles 18 and 19 may be angularly displaced a certain angle relatively to each other, for instance 45°. In the one machine, or in both, the rotor poles may also be equally positioned in which case the winding systems of the machine half must be angularly displaced in relation to each other, i. e. in the present case by 45°, so as to cause mutually phase-displaced alternating voltages to be created.

The arrangement may be modified in such manner that the commutator device $C_1$ of the secondary side, together with corresponding winding systems of the commutating generator, is removed whereby a high-tension alternating current instead of a direct current may be delivered on the secondary side of the main machine.

If the transformer is to be driven entirely electrically, i. e. when the electric energy to be transformed as well as the electric energy needed for covering the no-load losses are to be supplied to the primary side of the transformer, the driving motor M may be replaced by a second commutating generator $G_1$, in a manner illustrated in Figs. 6–10, reference character $G_2$ thereby designating the commutating generator above described with reference to Figs. 1–5. In the embodiment shown, the commutating generator $G_1$, as well as the main machine, is of the homopolar type and comprises a rotor $17_1$, $18_1$, $19_1$, see Figs. 8 and 9, having two stationary exciting windings 66 and 67 and eight iron cores 50—57 arranged around said rotor and carrying coils 58—65 and $58_1$—$65_1$ respectively, the latter being disposed round the outside of the former. The coils 58—65 form the generating windings of the commutating generator co-operating with the primary side of the direct current transformer and the coils $58_1$—$65_1$ the windings co-operating with the secondary side.

The "primary" coils of the commutating generator $G_1$ are in the manner described divided into two separated winding systems 58, 60, 62, 64 and 59, 61, 63, 65 respectively, the coils within each system being interconnected in series. In similar manner the "secondary" coils are divided into two systems $58_1$, $60_1$, $62_1$, $64_1$ and $59_1$, $61_1$, $63_1$, $65_1$ respectively, the coils within each system also being interconnected in series.

The primary winding systems 58, 60, 62, 64 and 28, 30, 32, 34 of the two commutating generators $G_1$ and $G_2$ respectively are interconnected in series and by the corresponding segments 5, 6 are connected to the primary armature winding 1—4 of the machine half A, and in a similar manner their second primary winding systems 59, 61, 63, 65 and 29, 31, 33, 35 respectively are connected in series with each other and by the segments 7, 8 of the commutator device C are connected to the primary armature winding of the machine half B. The secondary winding systems $58_1$, $60_1$, $62_1$, $64_1$ and $28_1$, $30_1$, $32_1$, $34_1$ of the commutating generators $G_1$ and $G_2$ respectively are also interconnected in series and by the auxiliary transformer $T_1$ and the segments $5_1$, $6_1$ are connected to the secondary armature winding of the machine half A, whereas the secondary winding system $59_1$, $61_1$, $63_1$, $65_1$ and $29_1$, $31_1$, $33_1$, $35_1$ also interconnected in series and by the auxiliary transformer $T_2$ and the segments $7_1$, $8_1$ of the commutator device $C_1$ are connected to the secondary armature winding of the machine half B.

The exciting windings 36 and 67 of the two commutating generators $G_2$ and $G_1$ respectively are interconnected in series and traversed by the high-tension secondary direct current in circuit $K_1$, 67, 36, $12_1$, $16_1$, $K_1$ whereas the outer exciting winding 66 of the generator $G_1$ is traversed by the low-tension primary direct current in circuit K, 66, 12, 16, K. The two exciting windings 66 and 67 of generator $G_1$ are adapted to counteract each other. The relation between the turns of said windings should preferably be such with respect to the relation between the turns of the primary and secondary armature windings 1—4 and $1_1$—$4_1$ respectively of the direct current transformer that the flux and thereby also the air gap induction is proportional to the no-load component of the ampere turns of the primary side, i. e. to the difference between the number of ampere turns of the primary side and that of the secondary side.

In the position shown in Fig. 6, commutation of the primary and secondary currents takes place in the machine half A at the segments 5, 6 and $5_1$, $6_1$ respectively. The commutating generator $G_1$ is thereby first brought into operation, said generator serving to reduce the primary current by twice the value of the no-load current without reacting on the secondary current and thereupon the commutating generator $G_2$ acts, to reverse the primary current thus reduced and simultaneously also the secondary current. This may be effected for instance by adjusting the commutator brushes in such manner that they will short-circuit the segments of the commutating device C somewhat before a corresponding short-circuiting takes place in the commutator device $C_1$.

According to the diagram of connection shown in Fig. 6, each of the primary and secondary windings of the direct current transformer forms in combination with corresponding windings of the commutating generators or with the auxiliary transformers, closed circuits, illustrated diagrammatically in Fig. 7 for the machine half A. In this figure P designates the primary armature winding 1—4 of said machine half and reference character S its secondary winding $1_1$—$4_1$. Characters $G_1$ and $G_2$ designate as before the two commutating generators provided with generating windings $G_1 1$ and $G_1 1_1$ corresponding to the winding systems of the commutating generator $G_1$ designated by 58, 60, 62, 64 and $58_1, 60_1, 62_1, 64_1$ respectively in Fig. 6, and windings $G_2 1$ and $G_2 1_1$ corresponding to the winding systems of the generator $G_2$ designated by 28, 30, 32, 34 and $28_1, 30_1, 32_1, 34_1$ respectively in said figure. By $T_1$ is designated the corresponding auxiliary transformer, the primary winding $t_1$ of which is connected in series with the generator windings $G_1 1_1$ and $G_2 1_1$ also interconnected in series, whereas the secondary winding $t_1'$ of said transformer is connected in series with the secondary winding S of the machine half A, all in conformity with the diagram illustrated in Fig. 6.

At the start of the process of commutation, the windings P and S are passed by the currents $I_p$ and $I_s$ respectively. By suitable selection of the number of turns in the different windings such a desired change in the circuits is obtained during the period of commutation that at the end thereof the currents in said circuits have the same numerical value as at the start, but flown in opposite directions. The course of action is as follows:—

In the winding $G_1 1$ a voltage is induced causing a decrease of the numerical value of the primary current corresponding to a change in the number of ampere turns of the winding P amounting to $2\ nI_m$, i. e. twice the ampere turns of the no-load component of the primary side, depending on the fact that the flux created in the generator $G_1$ is proportional to $nI_m$. Thereby the primary current is reduced by twice the value of the no-load current. On account of action of transformation within the machine, this reduction will create a voltage in the secondary winding S, said voltage being, however, counteracted by a voltage induced in the winding $G_1 1_1$ and thereby in the transformer winding $t_1$ resulting in the secondary current being not influenced by said change in the primary current. Thereafter voltages are induced in the windings $G_2 1$ and $G_2 1_1$ causing such changes of the primary and secondary currents that the numbers of ampere turns in the windings P and S are changed by the amount $2\ nI_s$ on account of the flux created in the generator $G_2$ being proportional to $nI_s$. At the end of the process, the currents have consequently changed direction but are of the same magnitude as at the start of the commutation.

By connecting the secondary windings of the direct current transformer to the secondary winding system of the commutating generators by auxiliary transformers $T_1$, $T_2$ high-tension windings are avoided as well as difficulties of insulation in the commutating generators.

Obviously, the commutating generators $G_1$ and $G_2$ may be adapted to operate separately in which case two auxiliary transformers would be necessary for each generator, i. e. four transformers in all. In that case the generator $G_1$ would operate as before to reduce the primary current by twice the value of the no-load component and, by means of the two auxiliary transformers connected to the same, to prevent said change in the primary current from influencing upon the secondary current. The generator $G_2$ would serve partly to commutate the reduced primary current and partly to reverse the secondary current by means of the two remaining auxiliary transformers. The lastmentioned arrangement with four auxiliary transformers may in certain cases be preferred to the arrangement with only two such auxiliary transformers, as in such case the dimensions of the commutating generators and of the auxiliary transformers may be determined with greater option.

The above statements with reference to the description of the arrangement shown in Figs. 1-5 with regard to the possibility of exciting the commutating generators separately, for instance by relays or the like, and also with regard to the length of the interval of commutation and the cooperation of the commutating generators with divided commutator brushes applies also to the arrangements according to Figs. 6-10.

In these figures the commutating generators $G_1$ and $G_2$ are shown connected directly to the shaft 46 of the main machine and arranged outside the commutator devices C and $C_1$ respectively.

In the embodiments described above it is assumed that the secondary current has the higher voltage. When instead thereof the primary current has a high voltage whereas the secondary current has a lower voltage, the auxiliary transformers $T_1$ and $T_2$ should be connected to the primary side of the direct current transformer.

The arrangement may also be modified in such manner that the commutator device $C_1$ of the secondary side is removed, in which case an alternating current instead of a direct current may be delivered on the secondary side.

In the arrangement according to Figs. 6-10 the two commutating generators are provided with double generating windings the one of which is connected to the primary winding of the direct current transformer whereas the other is connected with the secondary winding thereof. As set forth in the description of said embodiment, the excitation of the one commutating generator is thereby proportional to the difference between the primary and secondary ampere turns of the direct current transformer whereas the excitation of the other generator is proportional to the secondary ampere turns of said transformer, this in order to obtain the desired manner of operation. Designating the total additional voltages induced by the commutating generators $G_1$ and $G_2$ during the periods of commutation in the primary and secondary windings of said generators and of the direct current transformer respectively by $V_p$ and $V_s$, said condition will correspond to the following equations:—

$$\begin{cases} V_p = k[/nI/_p - /nI/_s] + k_1/nI/_s, \text{ and} \\ V_s = k_2[/nI/_p - /nI/_s] + k_3/nI/_s, \end{cases}$$

$/nI/_p$ being the ampere turns of the primary winding of the direct current transformer,
$/nI/_s$ the ampere turns of the secondary winding of said transformer, and
$k, k_1, k_2$ and $k_3$ positive or negative constants determined by the dimensions of the machines.

The partial voltages represented by the terms $$k[/nI/_p - /nI/_s]$$

and $$k_2[/nI/_p - /nI/_s]$$

are in the embodiment of Figs. 6–10 delivered by the commutating generator $G_1$ due to the fact that said generator is provided with two exciting windings counteracting each other and fed, one by the primary current of the transformer and the other by the high-tension secondary current of the same. Said voltages are thereby induced in both generating windings of the generator $G_1$, one of which is connected in series with the primary and the other with the secondary winding of the transformer. The partial voltages represented by the end-terms $k_1/nI/_s$ and $k_3/nI/_s$ are supplied by the second commutating generator $G_2$, the exciting winding of which is connected in series with the secondary winding of the transformer and thus passed by the high-tension secondary current, whereas the generating windings of the commutating generator in this case are also connected in series to the primary and secondary windings of the direct current transformer respectively. Those generating windings of the commutating generators connected in series with the high-tension secondary winding of the direct current transformer are, however, not directly connected to the high-tension secondary winding of said direct current transformer but are connected thereto by means of the auxiliary transformers $T_1$ and $T_2$ in order not unnecessarily to expose the commutating generators to said high voltage. In the embodiment mentioned, the exciting windings of both commutating generators are, however, directly connected to the high-tension secondary winding of the main machine which under certain conditions may cause difficulties with respect to insulation.

As will be shown in the following, it is not necessary to expose both commutating generators to the secondary voltage, but the exciting winding of the one generator may be connected only to that one of the primary or secondary windings of the transformer which has the lower voltage, whereas the exciting windings of the other generator may be connected to both windings of the transformer, or only to that one of the same which has the higher voltage, i. e. in the present case to the secondary winding.

Considering at first the firstmentioned alternative, a simple calculation will show that the equations above referred to representing the conditions for the desired operation of the commutating generators may also be written:—

$$\begin{cases} V_p = /k - k_1/[/nI/_p - /nI/_s] + k_1/nI/_p \text{ and} \\ V_s = /k_2 - k_3/[/nI/_p - /nI/_s] + k_2/nI/_p, \end{cases}$$

in which all references have the same designation as before. The only difference over the firstmentioned embodiment is that the exciting winding of the commutating generator $G_2$ is connected in series with the primary winding of the transformer instead of with the secondary one. A corresponding diagram of connections is shown in Fig. 11, containing throughout the same reference characters as used in Fig. 6 for corresponding parts.

In Fig. 12 the second alternative mentioned above is illustrated in which the one commutating generator is excited by the primary current and the other by the secondary current of the direct current transformer. Starting from the two original equations in this case a simple calculation gives the following form of the same:—

$$\begin{cases} V_p = k/nI/_p + /k_1 - k//nI/_s \text{ and} \\ V_s = k_2/nI/_p + /k_3 - k_2//nI/_s, \end{cases}$$

the designation of the references being unchanged. As will be seen from these equations, the exciting winding of the one commutating generator, for instance $G_1$, may hereby be connected in series with the primary winding of the direct current transformer, whereas the exciting winding of the other commutating generator, $G_2$, is connected in series with the secondary winding of the transformer in the manner shown in the figure.

Obviously the arrangements described above are merely illustrative and may be varied as desired to give the simplest construction of the winding systems in any special case.

Having thus described my invention what I claim is:

1. In a device of the class described, a plurality of windings adapted to operate as primary and secondary windings, commutators connected thereto and adapted to periodically reverse the connections to said windings, a commutating generator for compensating for the no load primary current of said device and a separate commutating generator adapted to set up a voltage for assisting commutation, said generators having exciting windings connected respectively in series with the paths of the main primary and secondary currents of said machine.

2. In a device of the class described, a plurality of windings adapted to operate as primary and secondary windings, commutators connected thereto and adapted to periodically reverse the connections to said windings, a commutating generator for compensating for the no load primary current of said device and having a pair of opposed exciting windings connected respectively in series with the paths of the main primary and secondary currents of said device and a separate commutating generator adapted to set up a voltage for assisting commutation and having an exciting winding connected in series with the path of the main secondary current of said device.

3. A direct current transformer having primary and secondary windings, commutators associated therewith and adapted to periodically reverse the connections to said windings, a commutating generator associated therewith and having windings arranged to apply a voltage in series with the voltage in said first mentioned windings and adapted to set up a voltage to assist commutation, said generator having a pair of exciting windings, one of which is connected in series with the primary winding of said transformer and the other of which is connected in series with the secondary winding thereof, said exciting windings being mutually opposed and arranged so that the resultant excitation is proportional to the no load component of the primary current.

4. A direct current transformer having primary and secondary windings, commutators associated therewith and adapted to periodically reverse the connections to said windings, and commutating generators adapted to compensate for the no load primary current and leakage losses thereof, said generators having exciting windings connected in series and connected in circuit with one of said first mentioned windings and one of said generators having an additional exciting winding connected in series with the other of said windings and electrically opposed to its first exciting winding.

5. A direct current transformer having groups of primary and secondary armature windings, commutators associated therewith and adapted to periodically reverse the connections to said windings, commutating generators having armature windings arranged in groups connected in series with said first groups of windings and adapted to compensate for the no load primary current and leakage losses of said transformer, said generators having exciting windings connected in series and connected in circuit with one of said first mentioned windings and one of said generators having an additional exciting winding connected in series with the other of said windings and electrically opposed to its first winding.

6. A direct current transformer having primary and secondary windings, commutators connected thereto and adapted to periodically reverse the connections to said windings, a commutating generator having windings connected in both the primary and secondary circuits thereof, one of said windings being adapted to reduce the primary current by twice the value of the no load current and the other of said windings being adapted to reverse the primary current thus reduced and simultaneously to reverse the secondary current.

7. An electric machine of the class described having a plurality of electrically independent sets of stationary, peripherally spaced windings, said sets being axially displaced with respect to each other, a rotor of magnetic material having north and south poles axially displaced to cooperate with the respective sets of windings, the windings of each set being electrically connected together, a separate reversing commutator connected to the windings of each set whereby said sets of windings are rendered independently operable, an auxiliary armature and a magnetic field member associated therewith and movable relative thereto for setting up a voltage to assist commutation, said auxiliary armature having a plurality of sets of windings electrically arranged in groups, each group being connected in series with one of said first mentioned sets of windings, said magnetic field member having an exciting winding connected in series with the path of the main armature current whereby the exciting current is proportional to the current in said armature.

8. An electric machine of the class described having a plurality of electrically independent sets of stationary, peripherally spaced windings, said sets being axially displaced with respect to each other, a rotor of magnetic material having north and south poles axially displaced to cooperate with the respective sets of windings, the windings of each set being electrically connected together, a separate reversing commutator connected to the windings of each set whereby said sets of windings are rendered independently operable, an auxiliary armature and a magnetic field member associated therewith and movable relative thereto for setting up a voltage to assist commutation, said auxiliary armature having a plurality of sets of windings electrically arranged in groups, certain groups being connected in series with one of said first mentioned sets of windings, other groups being connected to transformers the secondaries of which are connected in series with other of said sets, said magnetic field member having an exciting winding connected in series with the path of the main armature current whereby the exciting current is proportional to the current in said armature.

9. An electric machine of the class described comprising a rotor and a stator, said stator comprising a plurality of sets of stationary armature windings, the windings of each set being peripherally spaced and one set being axially spaced with respect to another set, conductors independently connecting the windings of each set in series, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said sets of windings individually with different commutators and means connecting said commutators in series to form a main armature circuit, a commutating generator comprising armature windings, conductors connecting the last mentioned armature windings respectively in series with the first mentioned windings, a second rotor and exciting windings therefor, said rotor being adapted to create a rotary magnetic field in inductive relation to said last mentioned armature windings whereby a voltage is generated therein for compensating for the residual commutation voltage of said first mentioned armature windings.

10. An electric machine of the class described comprising a rotor and a stator, said stator comprising a plurality of sets of stationary armature windings, the windings of each set being peripherally spaced and one set being axially spaced with respect to another set, conductors independently connecting the windings of each set in series, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said sets of windings individually with different commutators and means connecting said commutators in series to form a main armature circuit, a commutating generator comprising armature windings, conductors connecting the last mentioned armature windings respectively in series with the first mentioned windings, a second rotor and exciting windings therefor, said second rotor being operated in synchronism with said first rotor and adapted to create a rotating magnetic field in inductive relation to said armature windings, said exciting winding being connected in series in said main armature circuit whereby a voltage is generated in said second armature windings for compensating for the residual commutation voltage of said first mentioned armature windings.

11. An electric machine of the class described comprising a rotor and a stator, said stator comprising a plurality of sets of stationary armature windings, the windings of each set being peripherally spaced and one set being axially spaced with respect to another set, each set comprising a pair of independent windings adapted to constitute primary and secondary windings, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said windings individually with different commutators and means connecting the commutators of the primary and secondary windings respectively in series to form the main primary and secondary circuits, a commutating generator comprising armature windings, conductors connecting the last mentioned windings respectively in series with the first mentioned windings, a second rotor and exciting windings therefor, said second rotor being rotated in synchronism with said first mentioned rotor whereby a voltage is generated in said last mentioned armature windings for compensating for the residual commutation voltage of said first mentioned windings.

12. An electric machine of the class described comprising a rotor and a stator, said stator comprising a plurality of sets of stationary armature windings, the windings of each set being peripherally spaced and one set being axially spaced with respect to another set, each set comprising a pair of independent windings adapted to constitute primary and secondary windings, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said windings individually with different commutators and means connecting the commutators of the primary and secondary windings respectively in series to form the main primary and secondary circuits, a commutating generator comprising armature windings, conductors connecting the last mentioned windings respectively in series with the first mentioned windings, a second rotor and exciting windings therefor, said second rotor being rotated in synchronism with said first mentioned rotor whereby a voltage is generated in said last mentioned armature windings for compensating for the residual commutation voltage of said first mentioned windings, the armature windings of said commutating generator being peripherally spaced in a manner similar to said first mentioned windings.

13. An electric machine of the class described comprising a rotor and a stator, said stator comprising a plurality of sets of stationary armature windings, the windings of each set being peripherally spaced and one set being axially spaced with respect to another set, each set comprising a pair of independent windings adapted to constitute primary and secondary windings, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said windings individually with different commutators and means connecting the commutators of the primary and secondary windings respectively in series to form the main primary and secondary circuits, a commutating generator comprising armature windings, conductors connecting the last mentioned windings respectively in series with the first mentioned windings, a second rotor and exciting windings therefor, said second rotor being rotated in synchronism with said first mentioned rotor whereby a voltage is generated in said last mentioned armature windings for compensating for the residual commutation voltage of said first mentioned windings, said exciting windings being connected in series with one of said main circuits.

14. An electric machine of the class described comprising a rotor and a stator, said stator comprising a plurality of sets of stationary armature windings, the windings of each set being peripherally spaced and one set being axially spaced with respect to another set, each set comprising a pair of independent windings adapted to constitute primary and secondary windings, said rotor comprising a north pole piece and a south pole piece, said north pole piece being disposed in inductive relation to one of said sets of windings, said south pole piece being disposed in inductive relation to another of said sets of windings, a plurality of reversing commutators, conductors connecting said windings individually with different commutators and means connecting the commutators of the primary and secondary windings respectively in series to form the main primary and secondary circuits, a commutating generator comprising armature windings, conductors connecting the last mentioned windings respectively in series with the first mentioned windings, a second rotor and exciting windings therefor, said second rotor being rotated in synchronism with said first mentioned rotor whereby a voltage is generated in said last mentioned armature windings for compensating for the residual commutation voltage of said first mentioned windings, said exciting windings comprising a pair of opposed windings connected respectively in series with said primary and secondary circuits.

In testimony whereof I have affixed my signature.

BALTZAR CARL von PLATEN.